United States Patent [19]
Yatsu

[11] Patent Number: 5,967,667
[45] Date of Patent: Oct. 19, 1999

[54] LUBRICATING PLATE-CARRYING LINEAR MOTION GUIDE UNIT

[75] Inventor: Takashi Yatsu, Kamakura, Japan

[73] Assignee: Nippon Thompson Co., Ltd., Tokyo, Japan

[21] Appl. No.: 08/990,794

[22] Filed: Dec. 15, 1997

[30] Foreign Application Priority Data

Jan. 17, 1997 [JP] Japan .................................... 9-017680

[51] Int. Cl.⁶ ...................................................... F16C 29/06
[52] U.S. Cl. ................................................ 384/13; 384/45
[58] Field of Search .............................. 384/13, 15, 43, 384/44, 45

[56] References Cited

U.S. PATENT DOCUMENTS 4,420,193  12/1983  Teramachi .................................. 384/45

FOREIGN PATENT DOCUMENTS

| | | |
|---|---|---|
| 61-283634 | 12/1986 | Japan . |
| 6-346919 | 12/1994 | Japan . |
| 7-035146 | 2/1995 | Japan . |
| 8-200362 | 8/1996 | Japan . |
| 8-247144 | 9/1996 | Japan . |
| 8-247145 | 9/1996 | Japan . |

*Primary Examiner*—Lenard A. Footland
*Attorney, Agent, or Firm*—Browdy and Neimark

[57] ABSTRACT

This invention provides a linear motion guide unit provided with lubricating plates capable of being applied to existing linear motion guide units without changing the basic specifications thereof, and capable of being fixed to and removed from a casing easily. The lubricating plates are disposed between spacers fixed to end surfaces of end caps and end seals, and fixed to a casing, the lubricating plates slidingly contacting at least the raceway grooves in a track rail and being moved relatively to the track rail. The lubricating plates comprise sintered resin members having lubricating oil-impregnated porous structures. The sintered resin members are made by filling a predetermined metal mold with fine particles of a synthetic resin, and thermally molding the same particles.

12 Claims, 7 Drawing Sheets

ant-containing rubber or synthetic resin, and the seal
lips contact outer surfaces of a guide rail and seal clearances
between a slider and the guide rail, a lubricating oil which
oozes constantly and continuously from a lubricant-
containing seal bodies being supplied to the parts to be
sealed.

LUBRICATING PLATE-CARRYING LINEAR MOTION GUIDE UNIT

BACKGROUND OF THE INVENTION:

1. Field of the Invention

This invention relates to a linear motion guide unit applied to various kinds of robots, a semiconductor manufacturing apparatus and cutting and grinding machines, and more particularly to a linear motion guide unit provided with lubricating plates which can be incorporated simply in an existing linear motion guide unit.

2. Description of the Prior Art

In recent years, the mechatronic techniques have remarkably been developed, and a linear motion guide unit has been demanded to improve accuracy and speed and the reduction of dimensions. Moreover, a wider use of the linear motion guide unit has been seen at present with the development of the relative techniques. The linear motion guide unit is used in the technical field of a semiconductor manufacturing apparatus, an inspection machine and an industrial robot. For example, an assembling robot demands the wider use thereof, and from large-sized to small-sized assembling robots are being manufactured. Especially, the linear motion guide unit incorporated in these assembling robots has come to meet the requirements for improving the accuracy and speed and reducing the dimensions, and providing self-lubrication.

Figure 20:
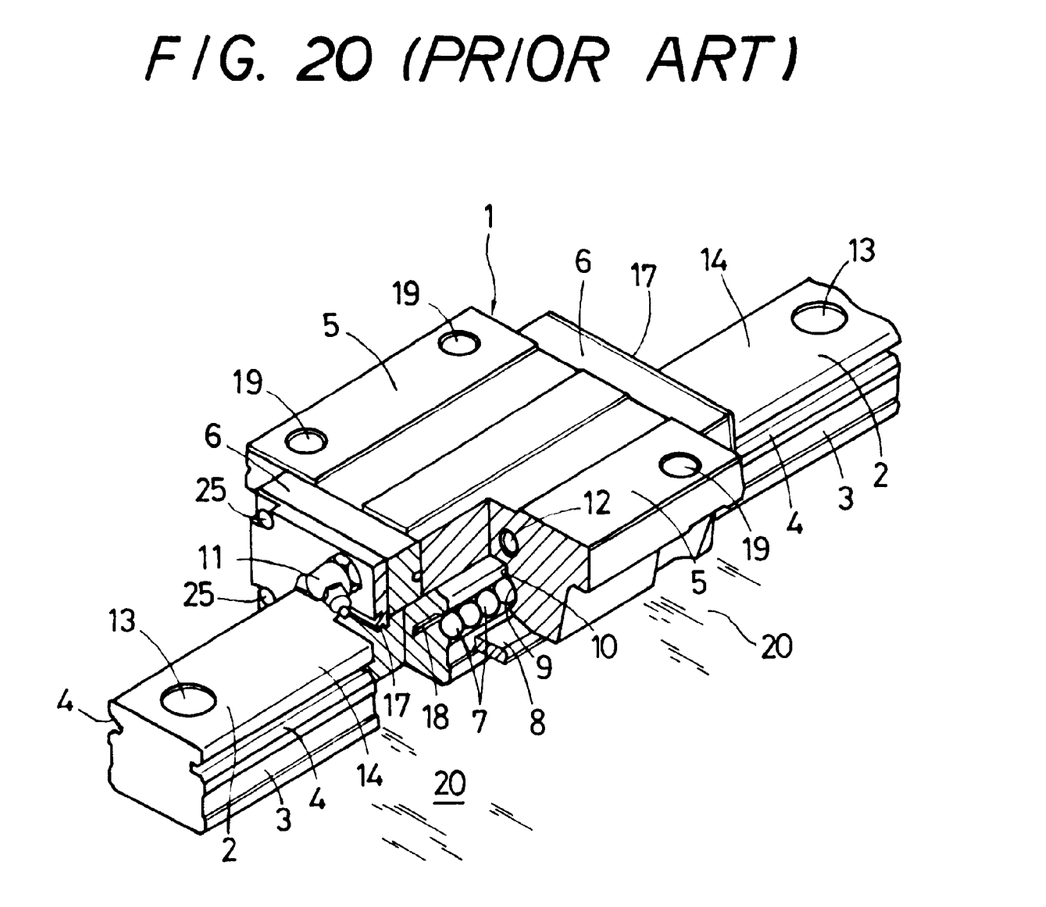
FIG. 20 is a partially cutaway view in perspective of a conventional linear motion guide unit.

A linear motion rolling guide unit shown in FIG. 20 is known. The linear motion rolling guide unit has a slider 1 mounted in a saddled state on a track rail 2 and slid freely thereon via rolling elements circulated along raceway grooves in the track rail 2. The track rail 2 is provided with the raceway grooves 4 in both of longitudinal side surfaces thereof. The track rail 2 is provided with a plurality of mutually spaced fixing holes 13 in a longitudinally extending upper surface thereof. The track rail 2 is fixed on a mounting base 20, such as a bed, a machine base and a working base. In the fixing holes 13 made in the track rail 2, bolts are inserted, which are then driven into threaded holes formed in the mounting base 20, whereby the track rail 2 is fixed on the mounting base 20. The slider 1 has a casing 5 movable relatively to the track rail 2, and end caps 6 fixed to both ends of the casing 5.

The casing 5 is provided in an upper portion thereof with fixing holes 19 used to fix some other machine, a part of a machine, a chuck or a clamp to the casing 5. The casing 5 and end caps 6 are provided in lower surfaces thereof with recesses 10 so that the casing 5 and end caps 6 are saddled at these recesses on the track rail 2 and moved thereon, and the portions of opposite surfaces of the recesses 10 which are opposed to the raceway grooves 4 in the track rail 2 raceway grooves 9. The rolling elements 7, such as balls are inserted in raceways formed by the opposed raceway grooves 4, 9, in such a manner that the rolling elements 7 roll therein. In order to prevent the rolling elements 7 from falling from the casing 5, retainer bands 18 are fixed to the casing 5 so as to enclose a large number of rolling elements 7. Lower seals 8 are provided on lower surface of the slider so as to attain the sealing of clearances between the track rail 2 and slider 1.

The end caps 6 are provided at both sides thereof with claws, by which the rolling elements 7 are scooped from the raceway grooves 4 forming load raceways between the end caps and track rail 2, and direction changing passages for changing the direction of the rolling elements 7 for the circulation thereof. End seals 17 for attaining the sealing clearances between both of longitudinal end portions of the track rail 2 and slider 1 are attached to the end caps 6. The end caps 6 are fixed to both end surfaces of the casing 5 by screws 25 inserted through a plurality of fixing holes. The rolling elements 7 in load regions which roll in the raceway grooves in the track rail 2 are guided into the direction changing passages formed in the end caps 6, and then moved into return passages 12 formed in parallel with the raceway grooves 9 in upper portions of the casing 5, whereby the rolling elements 7 roll in endless circulating passages. Owing to the rolling of the loaded rolling elements 7 rolling in the raceways formed between the raceway grooves 9 in the slider 1 and those 4 in the track rail 2, the track rail 2 and slider 1 can be moved relatively to each other.

The conventional seal means for linear guides include, for example, seal means disclosed in Japanese Patent Laid-Open Nos. 346919/1994, 35146/1995, 200362/1996, 247144/1996 and 247145/1996.

For example, the seal means for linear guides disclosed in Japanese Patent Laid-Open No. 346919/1994 comprise seal means, such as side seals and underseals provided on a slider of a linear guide which have seal lips formed out of lubricant-containing rubber or synthetic resin, and the seal lips contact outer surfaces of a guide rail and seal clearances between a slider and the guide rail, a lubricating oil which oozes constantly and continuously from a lubricant-containing seal bodies being supplied to the parts to be sealed.

A method of manufacturing communicating porous sintered bodies disclosed in Japanese Patent Laid-Open No. 283634/1986 is known as a porous sintered body manufacturing method. The communicating porous sintered body manufacturing method mentioned above is a method of obtaining porous sintered bodies having communicating pores of an average pore diameter of 10–150 $\mu$m and an average porosity of 25–45 vol. % by mixing polyethylene powder of superhigh molecular weight and powder of a polyolefin resin molding material with each other at a predetermined ratio, and then sintering the resultant mixture.

In the linear motion rolling guide unit shown in FIG. 20, grease or a lubricating oil is used widely in general as a lubricant. When the lubricant comprises grease, it is supplied from grease nipples 11 to rolling passages of the rolling elements to lubricate the rolling passages. When the lubricant comprises a lubricating oil, the lubricating operation is carried out through pipe joints provided instead of the grease nipples. The linear motion guide unit is provided on end surfaces thereof with end seals usually, so as to prevent waste and dust from entering the slider. The end seals comprises rubber members formed out of nitrile butadiene rubber (NBR), and metal cores.

In recent years, in which the range of use of a linear motion guide unit has been expanded, it has been demanded that imperfect lubrication does not occur even in the condition in which the oil feeding cannot be carried out or under severe condition of use of the guide unit, for example, in an environment in which a large quantity of waste, dust and chips occur and are deposited on parts or in a region of severe temperature conditions. For example, the end seals in the seal means for the linear guide disclosed in the above-mentioned Japanese Patent Laid-Open No. 346919/1994 are formed out of lubricant-containing rubber or synthetic resin, and those in the seal means for the lubricant-containing polymer-lubricated linear guide unit disclosed in the above-mentioned Japanese Patent Laid-Open No. 200362/1996 comprise lubricant-containing polymer members.

In the seal means disclosed in the above-mentioned Japanese Patent Laid-Open Nos. 346919/1994 and 200362/

1996, the lubricant-containing polymer members comprise a material obtained by mixing polyolefin polymer and α-olefin oil with each other, thermally melting the mixture thus obtained, injecting the molten mixture into a predetermined mold, and molding the mixture by cooling and solidifying the same while pressing the same. Thus, complicated, high-degree techniques are required to manufacture the lubricant-containing polymer members.

SUMMARY OF THE INVENTION

An object of the present invention is to solve these problems, and provide a lubricating plate-carrying linear motion guide unit capable of maintaining excellent lubricating condition by enabling a self-lubricating operation by means of lubricating plates even under severe conditions of use of the guide unit; capable of simply applying the lubricating plates to an existing linear motion guide unit by changing the design thereof slightly; attaining a long lifetime by the self-lubricating operation; improving the dust-proofing capability with respect to the lubricating operation; maintaining a clean environment; obtaining a maintenance-free structure for the supplying of the oil; and manufacturing the lubricating plates simply.

The present invention relates to a linear motion guide unit comprising a track rail provided with raceway grooves in both of longitudinally extending side surfaces thereof, and a slider moved slidingly on and relatively to the track rail, the slider being provided with a casing having raceway grooves opposed to those in the track rail, rolling elements rolling between these raceway grooves, end caps fixed to both end surfaces of the casing, lubricating plates fixed to end surfaces of the end caps, and end seals fixed to end surfaces of the lubricating plates, the lubricating plates being formed of sintered resin members having a lubricating oil-impregnated porous structures.

The sintered resin members constituting the lubricating plates are made by placing minute particles of a synthetic resin in a predetermined metal mold, and thermally molding the same.

The lubricating plates at least slidingly contact the raceway grooves in the track rail and are moved relatively to the track rail.

The lubricating plates comprise at at least the sections thereof which are opposed to the raceway grooves in the track rail densely pore-distributed portions, and at the other sections thereof sparsely pore-distributed portions.

The lubricating plates are formed at at least the inner circumferential surfaces thereof which are opposed to the raceway grooves in the track rail of porous surfaces in an opened state, and at the surfaces of the other portions thereof of non-porous surfaces.

The lubricating plates are formed at the upper surfaces thereof and the inner circumferential surfaces thereof which are opposed to the raceway grooves in the track rail of porous surfaces in an opened state, and at the surfaces of the other portions thereof of non-porous surfaces.

The lubricating plates are provided at the upper portions thereof with storage chambers capable of holding a lubricating oil therein.

The lubricating plates are cut out at the portions thereof which correspond to grease nipples or lubricating oil supply pipe joints provided on the end caps.

The lubricating plates are provided with covers comprising thin elastic plates capable of covering side and upper surfaces thereof.

The lubricating plates comprise two separate complementary lubricating plate portions opposed to both side surfaces of the track rail, and these lubricating plate portions are joined together by support plates positioned above the track rail.

The bolts for fixing the end seals, lubricating plates and end caps to the casing are inserted through the end seals and end caps and through collars provided in the recesses formed in the lubricating plates, the bolts being then driven into bolt holes of the casing.

In order to prevent the end caps and lubricating plates from being deformed, spacers are provided therebetween.

In this linear motion guide unit, a lubricating oil is supplied smoothly at all times from the lubricating plates to spaces between the raceway grooves owing to the above-described structure, and it is possible to secure an excellent lubricated condition without causing imperfect lubricating condition to occur, reduce the slide resistance of a slider with respect to a track rail, and prevent the occurrence of abrasion. The lubricating plates may be formed by selecting a lubricating oil the condition of use of which suits molded sintered resin members having a porous structure, and filling the pores of the sintered resin members with the lubricating oil. Conversely, the lubricating plates may be formed by selecting the material for the sintered resin members so that the resin members suit the lubricating oil to be used. The handling of the lubricating plates and the changing of the specifications thereof can be done simply. Moreover, the sintered resin members constituting the lubricating plates can be molded simply with a high precision, and a manufacturing precision of, for example, around ±0.025 can be secured. Accordingly, the lubricating plates can be provided as optimum parts of a linear motion guide unit to be incorporated in a precision machine.

This linear motion guide unit can be incorporated in various types of existing linear motion guide units and used practically without changing its basic specifications at all. Namely, the lubricating plates can be applied to the existing linear motion guide units as long as they use a track rail of the same standards and even when the shape and sizes are different. Therefore, lubricating plates having a wide range of application can be provided. Since these lubricating plates can be fixed simply to the end surfaces of a slider in even a conventional linear motion guide unit already incorporated in a cutting machine, the self-lubricating performance of the linear motion guide unit in the existing machine can be improved.

DETAILED DESCRIPTION OF THE EMBODIMENTS

The embodiments of the linear motion guide unit according to the present invention will now be described with reference to the drawings. Referring to the drawings, the parts having the same construction and functions as those of the conventional linear motion rolling guide unit shown in FIG. 20 are designated by the same reference numerals shown therein.

Figure 1:
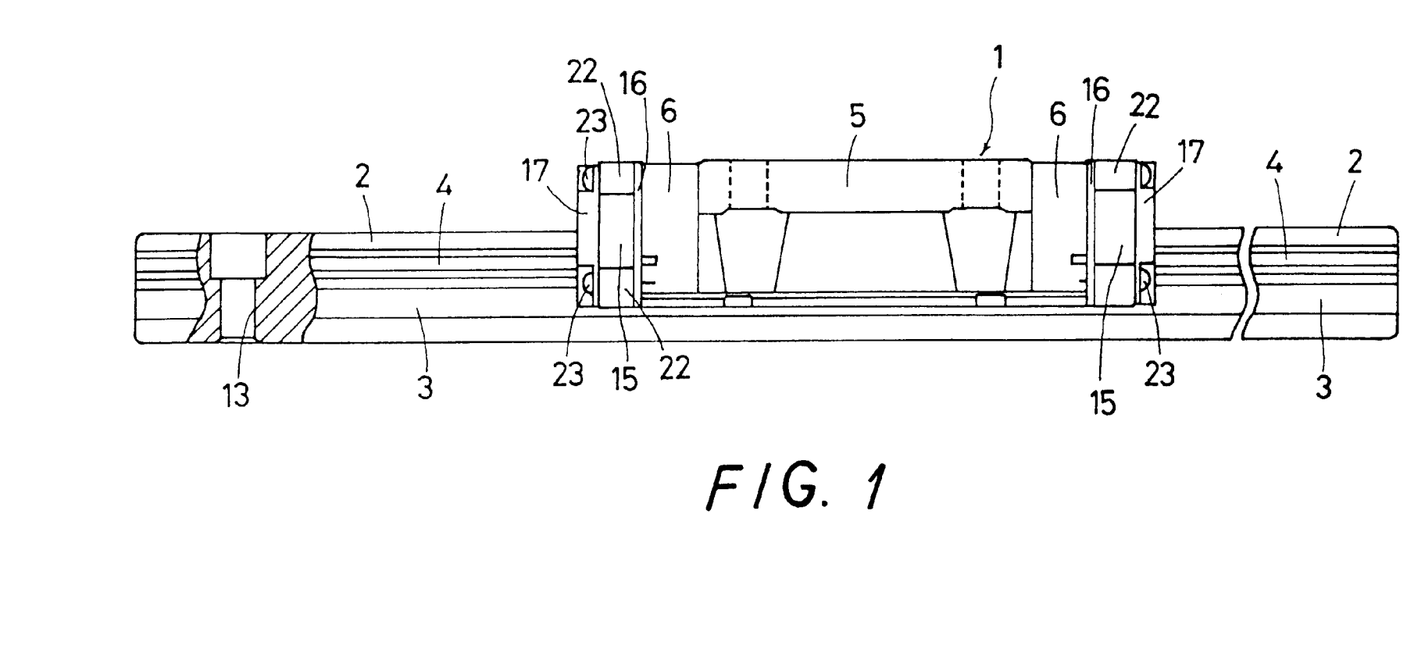
FIG. 1 is a side view showing an embodiment of the linear motion guide unit according to the present invention.
Figure 2:
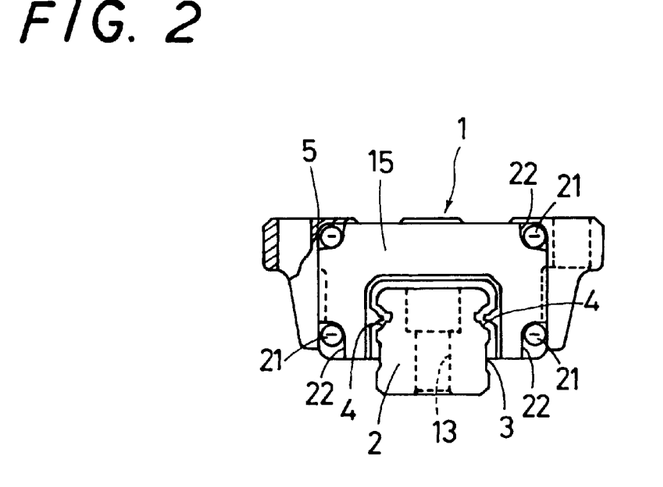
FIG. 2 is a front view showing the condition of the linear motion guide unit of FIG. 1 with an end seal removed therefrom.

A first embodiment of the linear motion guide unit comprises a track rail 2 provided with raceway grooves 4 in both of longitudinally extending side surfaces thereof, and a slider 1 saddled and slidably fixed on the track rail 2. The track rail 2 has an I-shaped cross section, both side surfaces 3 of which are recessed at the regions of the raceway grooves 4. The slider 1 is slidable relatively to the track rail 2, and has a casing 5 provided with raceway grooves (refer to the reference numeral 9 in FIG. 20) in the portions thereof which are opposed to the raceway grooves 4, a large number of rolling elements (refer to a reference numeral 9 in FIG. 20) rolling between the opposed raceway grooves 4 so that the rolling elements can roll relatively to one another, and end caps 6 fixed to both ends of the casing 5 with respect to the sliding direction thereof, i.e. both of the longitudinal ends thereof. End seals 17 attaining the longitudinal sealing of clearances between the track rail 2 and slider 1 are fixed to the end caps 6. In order to prevent the rolling elements from falling from the casing 5, retainer bands are fixed to the casing 5 so as to enclose the rolling elements. In order to seal clearances between the casing 5 and end caps 6 and both of longitudinal side surfaces 3 of the track rail 2, lower seals are fixed to lower surfaces of the end caps 6 and casing 5.

The slider 1 is mounted in a saddled state on the track rail 2, and slid thereon freely via a plurality of rolling elements circulating along the raceway grooves 4 in the track rail 2. The rolling elements in load regions rolling in the raceway grooves 4 in the track rail 2 are guided into direction changing passages formed in the end caps 6, and they are then moved into return passages (refer to a reference numeral 12 in FIG. 20) formed in parallel with the raceway grooves in the casing 5, whereby the rolling elements circulate limitlessly in endless circulating passages. The slider 1 can be slid freely on and relatively to the track rail 2 owing to the rolling of the loaded rolling elements positioned between the raceway grooves in the slider 1 and those 4 in the track rail 2.

The first embodiment having the above-described construction is characterized in that, especially, lubricating plates 15 are provided which are disposed on the end surfaces of the end caps 6 and adapted to be slid on the track rail 2 relatively thereto. The end seals 17 are provided on end surfaces of the lubricating plates 15 and adapted to be slid on the track rail 2 relatively thereto. The lubricating plates 15 comprise sintered resin members of a porous structure, and a lubricating oil with which pore portions of the sintered resin members of a porous structure are impregnated. The sintered resin portions constituting the lubricating plates 15 are formed by thermally pressure molding the fine particles of a synthetic resin.

In order to fix the end seals 17, lubricating plates 15 and end caps 6 to the casing 5, bolts 23 are inserted through the end seals 17 and end caps 6, and then through collars 21 provided in recesses 22 formed in the lubricating plates 15, the bolts 23 being then driven into bolt holes of the casing 5. Between the lubricating plates 15 and end caps 6, spacers 16 are provided. The lubricating plates 15 are provided on the end caps 6 via the spacers 16, and the end seals 17 on the outer sides of the end caps 6. The spacers 16 comprise thin steel plates, and are provided so that the end caps 6 and lubricating plates 15 are not deformed when they are tightened by the bolts 23.

In order to provide the collars 21, in which the bolts 23 for fixing the lubricating plates to the casing 5 or end caps 6 can be inserted, on the lubricating plates 15, recesses 22 are formed in the four corners of each of the lubricating plates 15 in this embodiment by a cutting method. Owing to the collars 21 provided on the four corners of each of the lubricating plates 15, the lubricating plates 15 are not directly tightened by the bolts 23, and they are held in a sandwiched state between the end seals 17 and spacers 16, so that the deformation of the lubricating plates 15 due to a pressing force occurring during a bolt tightening operation is prevented.

Figure 3:
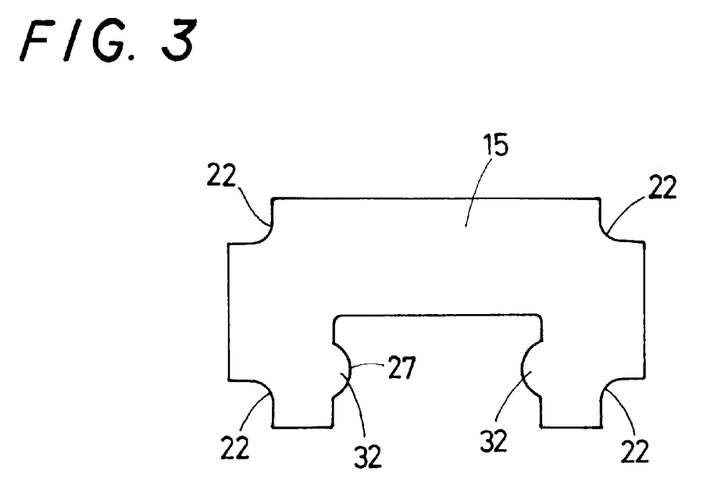
FIG. 3 is a front view showing a first example of a lubricating plate incorporated in the linear motion guide unit of FIG. 1.
Figure 4:
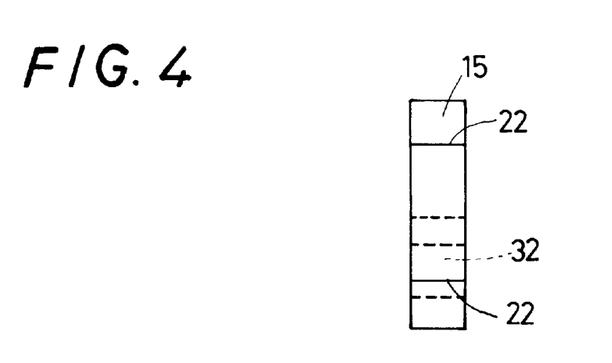
FIG. 4 is a side view of the lubricating plate of FIG. 3.
Figure 5:
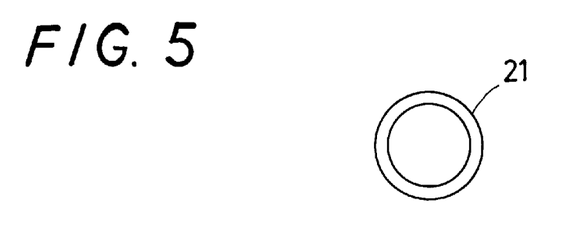
FIG. 5 is a front view of a collar fixed to bolt portions of the lubricating plate.
Figure 6:
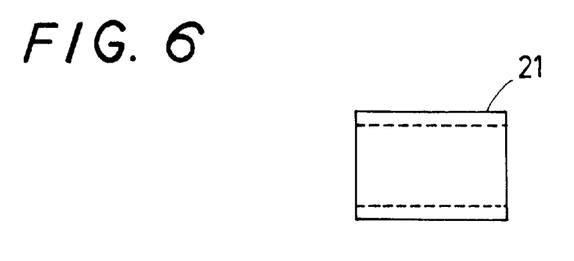
FIG. 6 is a side view of the collar of FIG. 5.

The lubricating plates 15 are provided with projections 32 extending inward so as to slidingly contact at inner surfaces thereof at least the raceway grooves 4 in the track rail 2, whereby a lubricant (or a lubricating oil) contained in the sintered resin members are constantly supplied to the raceway grooves 4. The lubricating plates 15 may contact the track rail 2 slidingly at the whole inner circumferential surfaces thereof. In order to reduce the consumption of the lubricating oil, the lubricating plates 15 are preferably formed so as to slidingly contact at least the raceway grooves 4 in accordance with the condition of use thereof.

A molded product, a raw material for the lubricating plates 15 is manufactured by filling a predetermined mold with fine particles of a polyethylene resin of a high molecular weight, for example, powder of the resin of 30 μm in fine grain diameter and 250–300 μm in coarse grain diameter, and subjecting the powder to thermal pressure molding, and the lubricating plates 15 obtained comprise open pore-carrying sintered resin members. Porous sintered resin members having a porosity of, for example 40–50% can be used for the production of the lubricating plates 15.

The lubricating plates 15 are finished by immersing the porous sintered resin members in a turbine oil, a lubricating oil, and impregnating the same members therewith at pore portions thereof. The ratio and quantity of the lubricating oil contained in the lubricating plates can be regulated to 41 wt. % and around 2 cc respectively by immersing the lubricating plates 15 in the lubricating oil for, for example, 30 minutes. The content of the lubricating oil can be regulated in accordance with the condition for the use of slider 1.

Figure 7:
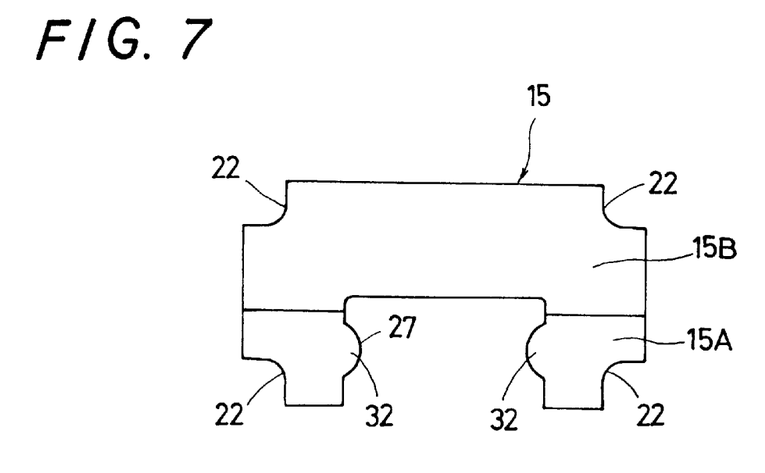
FIG. 7 is a front view showing a second example of a lubricating plate.
Figure 8:
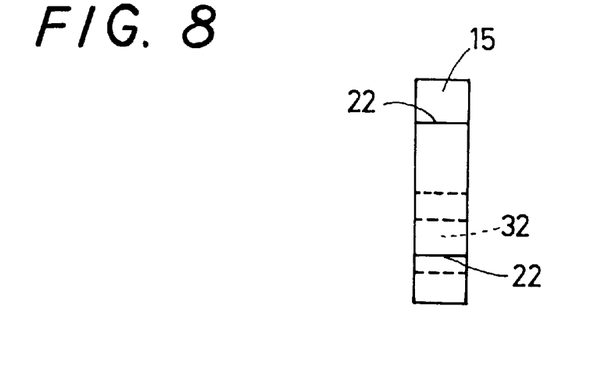
FIG. 8 is a side view of the lubricating plate of FIG. 7.

A second embodiment of this linear motion guide unit will now be described with reference to FIGS. 7 and 8. In the second embodiment, the lubricating plates 15 are formed by composite sintered resin members comprising densely pore-distributed portions 15A and sparsely pore-distributed portions 15B. The lubricating plates 15 in this embodiment are formed of densely pore-distributed portions 15A at the sections thereof which slidingly contact the raceway grooves 4 in the track rail 2, and sparsely pore-distributed portions 15B at the other sections thereof. Namely, the densely pore-distributed portions of the lubricating plates 15 are in a lubricating oil sucking state, and these structures enable a flow of the lubricating oil to the densely pore-distributed portions 15A to be promoted. For example, when projections 32 of the densely pore-distributed portions 15A contact the raceway grooves 4 closely and slidably, the supplying of the lubricating oil to the track rail 2 is promoted, and, when the lubricating oil is supplied to the raceway grooves 4, it is moved from the sparsely pore-distributed portions 15B to the densely pore-distributed portions 15A, which are thus resupplied with the lubricating oil to enable a lubricated condition to be smoothly attained. The composite sintered resin members can be made, for example, by using resin powder of different particle diameters, or by regulating the sintering temperature. In another example, these resin members can be made by forming the densely pore-distributed portions 15A and sparsely pore-distributed portions 15B separately, and combining these portions 15A, 15B with each other by covers 30 which will be described later.

Figure 9:
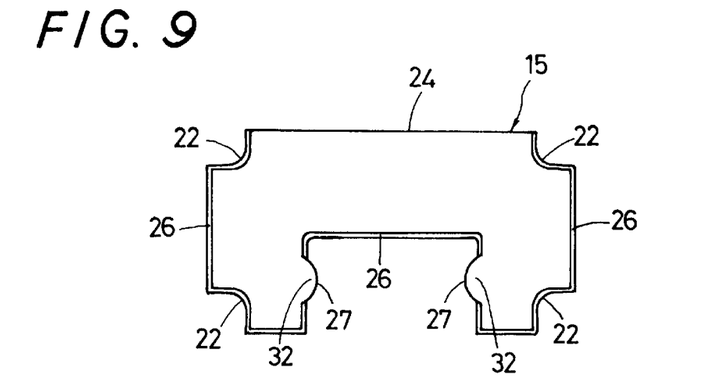
FIG. 9 is a front view showing a third example of a lubricating plate.
Figure 10:
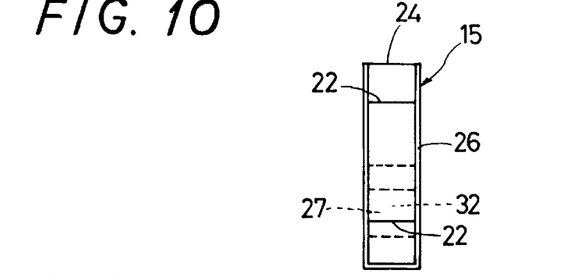
FIG. 10 is a side view of the lubricating plate of FIG. 9.

A third embodiment of the linear motion guide unit will now be described with reference to FIGS. 9 and 10. In the third embodiment, the surface portions of lubricating plates which are other than the surface portions slidably contacting the raceway grooves 4 in a track rail 2 and upper surface portions 24 impregnated with a lubricating oil to be supplied to lubricating plate bodies are formed of non-pore-carrying surface layers 26. The non-pore-carrying surface layers 26 of the lubricating plates 15 can be formed by increasing the temperature of surface layer portions and thereby filling up pores in the surfaces of porous portions, or coating these surfaces with a resin so that the surfaces of the porous portions become non-porous. Since the lubricating plates in the third embodiment are provided with the non-pore-carrying surface layers 26, the leakage of the lubricating oil from these layers 26 to the outside does not occur, and the lubricating oil is supplied from porous surface layers 27 at the sections of the lubricating plates which are opposed to the relative raceway grooves 4 to the same raceway grooves 4.

Figure 11:
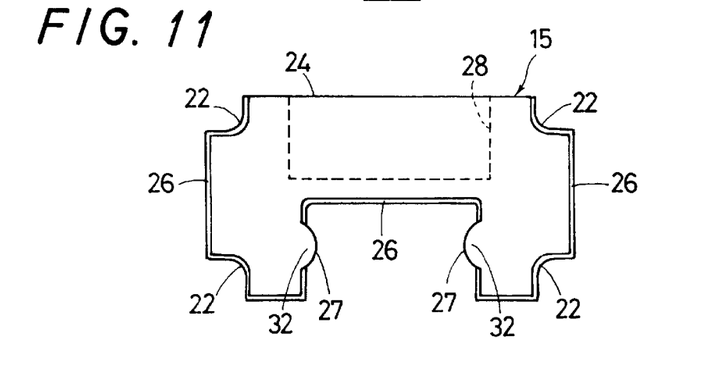
FIG. 11 is a front view showing a fourth example of a lubricating plate.
Figure 12:
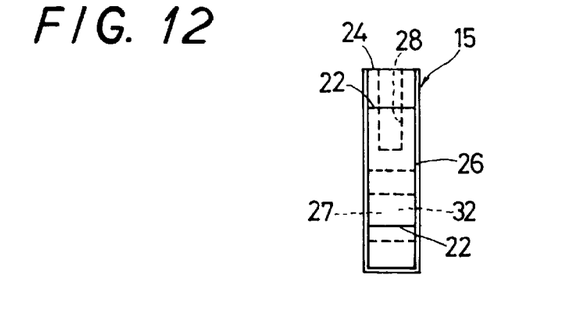
FIG. 12 is a side view of the lubricating plate of FIG. 11.

A fourth embodiment of this linear motion guide unit will now be described with reference to FIGS. 11 and 12. The fourth embodiment has the same construction as the third embodiment shown in FIG. 9 except that lubricating plates 15 impregnated with a lubricating oil are provided with lubricating oil storage chambers 28 opened on the side of upper surface portions 24 thereof. Owing to the lubricating oil chambers 28 provided in the lubricating plates 15, a lubricating oil supplying period of time can be prolonged. Although the upper surface portions 24 of the lubricating plates 15 in the fourth embodiment are opened, covers closing the upper surface portions 24 can also be provided, and the upper surface portions 24 may be closed by being coated with a certain material as occasion demands.

Figure 13:
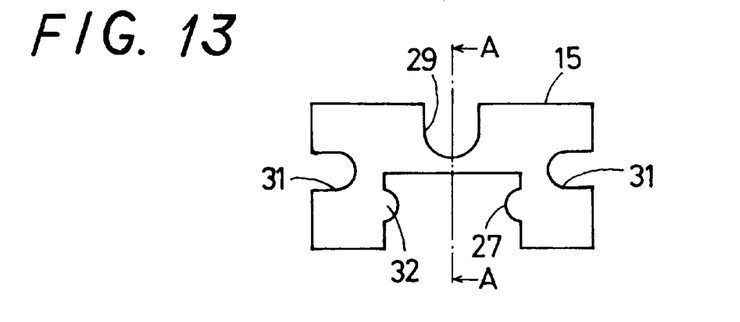
FIG. 13 is a front view showing a fifth example of a lubricating plate.
Figure 14:
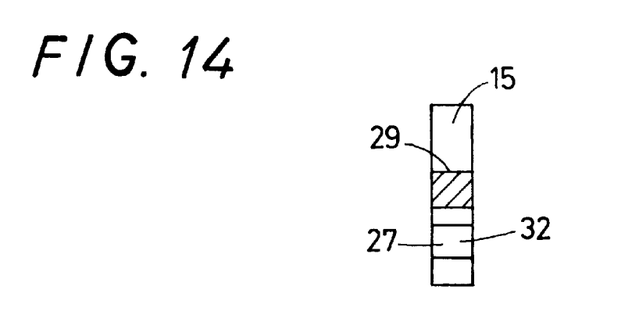
FIG. 14 is a sectional view of the lubricating plate taken along the line A—A in FIG. 13.

A fifth embodiment of this linear motion guide unit will now be described with reference to FIGS. 13 and 14. The lubricating plates in the linear motion guide unit of the fifth embodiment are provided with recesses 29 formed by cutting out the portions thereof which correspond to grease nipples (refer to a reference numeral 11 in FIG. 20) or lubricating oil supply pipe joints (not shown). The fifth embodiment can be applied to a linear motion guide unit provided with grease nipples or lubricating oil supply pipe joints, in which a lubricant or a lubricating oil from the grease nipples or lubricating oil supply pipe joints can be supplied to the raceway grooves 4. Accordingly, a structure having a dual lubricating system capable of effecting a lubricating operation by a lubricating oil from the grease nipples or lubricating oil supply pipe joints and a lubricating oil from the lubricating plates 15 can be provided. In the fifth embodiment, recesses 31 for fixing the lubricating plates by bolts or screws are provided in two portions of each thereof.

Figure 15:
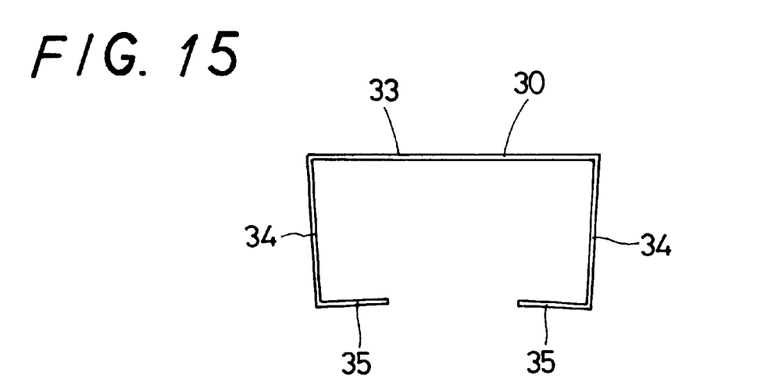
FIG. 15 is a front view suggesting a sixth example of a lubricating plate and showing a cover capable of being fixed to the lubricating plate.
Figure 16:
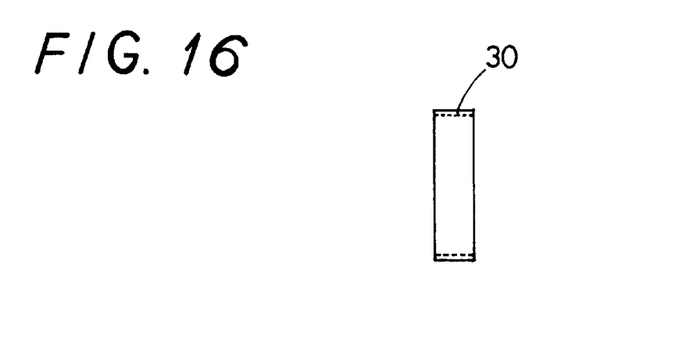
FIG. 16 is a side view of the cover of FIG. 15.

A sixth embodiment of this linear motion guide unit will now be described with reference to FIGS. 15 and 16. The sixth embodiment employs covers 30 capable of covering outer circumferential surfaces of lubricating plates 15 and closing pores of the porous structures. The covers 30 comprise thin elastic plates, such as elastic metal plates, and have upper portions 33, side portions 34 and lower portions 35. The covers 30 can prevent dust from being deposited on, the breakage of, and the leakage of a lubricating oil from, the lubricating plates 15. Owing to the resilient force of the thin elastic plates 15, projections 32 of the lubricating plates 15 are pressed against raceway grooves 4 in the track rail 2. This enables the lubricating plates 15 to be brought into close contact with the raceway grooves 4 reliably, and the slidable contacting condition of the projections 32 to be kept excellent.

Figure 17:
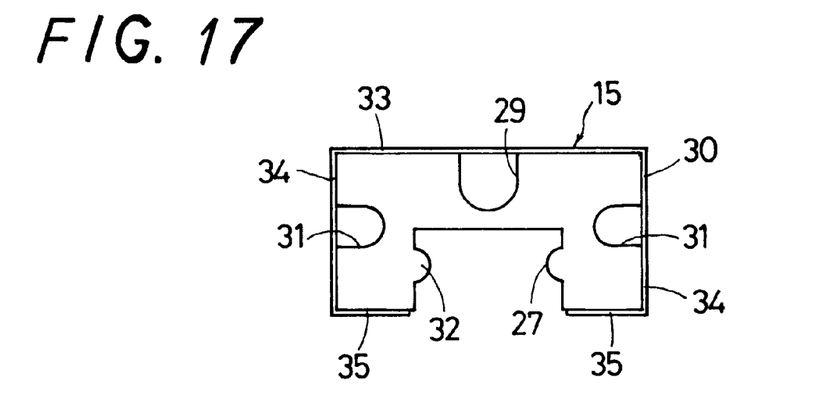
FIG. 17 is a front view showing a seventh example of a lubricating plate.
Figure 18:
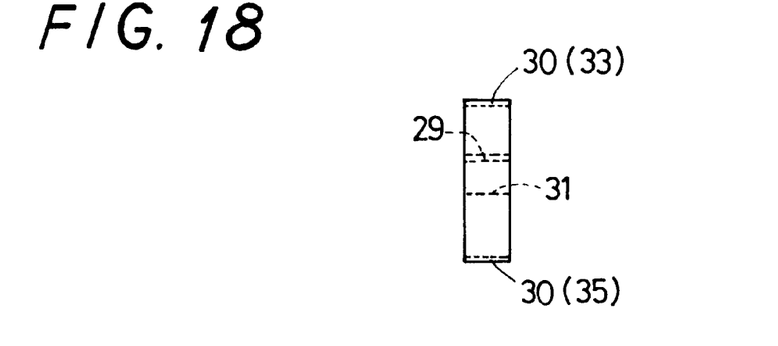
FIG. 18 is a side view of a cover of FIG. 17.

A seventh embodiment of this linear motion guide unit will now be described with reference to FIGS. 17 and 18. The seventh embodiment is formed by fixing the covers 30 shown in FIG. 15 and capable of closing pores of porous structures of lubricating plates 15 by covering their outer circumferential surfaces therewith to the lubricating plates 15 shown in FIG. 13. The covers 30 can also be applied to the lubricating plates 15 in each of the previously-described embodiments, though illustrations are omitted.

Figure 19:
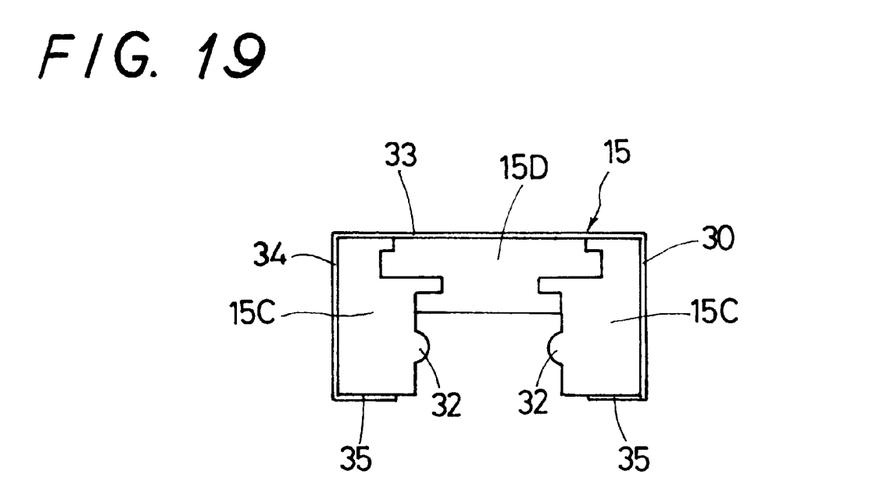
FIG. 19 is a front view showing an eighth example of a lubricating plate.

An eighth embodiment of this linear motion guide unit will now be described with reference to FIG. 19. In the eighth embodiment, the lubricating plates 15 comprise two separate lubricating plate portions 15C disposed on the left and right sides of a track rail 2, and these lubricating plate portions 15C are positioned and fixed to each other by support plates 15D provided above the track rail 2, the assembled condition of these parts being retained by covers 30 comprising thin elastic plates and applied to outer circumferential surfaces thereof. The lubricating plates 15 in the eighth embodiment can be fixed to and combined with a casing 5 with respect to the track rail 2 by independently assembling the lubricating plate portions 15C and support plates 15D with respect to the track rail 2, and covering the assembled products with the covers 30. Since the lubricating plate portions 15C and support plates 15D are covered with the covers 30, the fixed condition of the lubricating plate portions 15C and support plates 15D can be stabilized, and the above-mentioned function of the covers 30 can be fulfiled.

What is claimed is:

1. A linear motion guide unit comprising a track rail provided with raceway grooves in both of longitudinally extending side surfaces thereof, and a slider moved slidingly on and relatively to said track rail, said slider being provided with a casing having raceway grooves opposed to those in said track rail, rolling elements rolling between said raceway grooves, end caps fixed to both end surfaces of said casing, lubricating plates fixed to end surfaces of said end caps, and end seals fixed to end surfaces of said lubricating plates, said lubricating plates being formed of sintered resin members having lubricating oil-impregnated porous structures.

2. A linear motion guide unit according to claim 1, wherein said sintered resin members constituting said lubricating plates are made by placing fine particles of a synthetic resin in a predetermined metal mold, and thermally molding said fine particles.

3. A linear motion guide unit according to claim 1, wherein said lubricating plates slidingly contact at least said raceway grooves in said track rail and are moved relatively to said track rail.

4. A linear motion guide unit according to claim 1, wherein said lubricating plates comprise at at least the sections thereof which are opposed to said raceway grooves in said track rail densely pore-distributed portions, and at the other sections thereof sparsely pore-distributed portions.

5. A linear motion guide unit according to claim 1, wherein said lubricating plates are formed at at least the inner circumferential surfaces thereof which are opposed to said raceway grooves in said track rail of porous surfaces in an opened state, and at the surfaces of the other portions thereof of non-porous surfaces.

6. A linear motion guide unit according to claim 1, wherein said lubricating plates are formed at upper surfaces thereof and the inner circumferential surfaces thereof which are opposed to said raceway grooves in said track rail of porous surfaces in an opened state, and at the surfaces of the other portions thereof of non-porous surfaces.

7. A linear motion guide unit according to claim 1, wherein said lubricating plates are provided at the upper portions thereof with storage chambers capable of holding a lubricating oil therein.

8. A linear motion guide unit according to claim 1, wherein said lubricating plates are cut out at the portions thereof which correspond to grease nipples or lubricating oil supply pipe joints provided on said end cups.

9. A linear motion guide unit according to claim 1, wherein said lubricating plates are provided with covers comprising thin elastic plates capable of covering side and upper surfaces thereof.

10. A linear motion guide unit according to claim 1, wherein said lubricating plates comprise two separate complementary lubricating plate portions opposed to both side surfaces of said track rail, said lubricating plate portions being joined together by support plates positioned above said track rail.

11. A linear motion guide unit according to claim 1, wherein bolts for fixing said end seals, said lubricating plates and said end caps to said casing are inserted through said end seals and said end caps and through collars provided in said recesses formed in said lubricating plates, said bolts being then driven into bolt holes of said casing.

12. A linear motion guide unit according to claim 1, wherein spacers are provided between said end caps and said lubricating plates so as to prevent said end caps and said lubricating plates from being deformed.

* * * * *